Sept. 2, 1969  J. W. KNAUF  3,464,766
STEREO-IMAGE ALTERNATOR SYSTEM
Filed Oct. 28, 1966  7 Sheets-Sheet 1

INVENTOR
JACK W. KNAUF
BY Ernest S. Cohen
Gersten Sadowsky
ATTORNEYS

INVENTOR
JACK W. KNAUF

Sept. 2, 1969  J. W. KNAUF  3,464,766
STEREO-IMAGE ALTERNATOR SYSTEM
Filed Oct. 28, 1966  7 Sheets-Sheet 6

INVENTOR
JACK W. KNAUF
BY Ernest S. Cohen
Gersten Sadowsky
ATTORNEYS

Sept. 2, 1969 J. W. KNAUF 3,464,766
STEREO-IMAGE ALTERNATOR SYSTEM
Filed Oct. 28, 1966 7 Sheets-Sheet 7

INVENTOR
JACK W. KNAUF
BY
Ernest S. Cohen
Gersten Sadowsky
ATTORNEYS

United States Patent Office 3,464,766
Patented Sept. 2, 1969

3,464,766
STEREO-IMAGE ALTERNATOR SYSTEM
Jack William Knauf, Falls Church, Va., assignor to the United States of America as represented by the Secretary of the Interior
Filed Oct. 28, 1966, Ser. No. 591,057
Int. Cl. G03b 21/14
U.S. Cl. 353—6          11 Claims

ABSTRACT OF THE DISCLOSURE

A stereoscopic plotting apparatus has an optical system comprising a pair of image projecting mechanisms for projecting a right eye view and a left eye view upon the same area of a viewing plane. Each projecting mechanism has a shutter and the shutters are synchronized such that the left eye view and the right eye view are alternately projected onto the viewing plane. A viewing apparatus has a shutter mechanism which is synchronized with the shutters of the projecting mechanisms and provides for alternate viewing of the left and right views. An alternate embodiment of a viewing apparatus consists of a pair of glasses on which is mounted a motor driven belt having alternating transparent and opaque areas for alternately blocking the left and right eye views.

---

This invention relates to improvements in operational systems involving the optical arrangements of stereoscopic plotting apparatus. Typical of such apparatus are the stereoscopic photographic projection mapping instruments disclosed in Patent No. 2,696,752, issued Dec. 14, 1954 to R. K. Bean, and Patent No. 2,833,178, issued May 6, 1958 to H. T. Kelsh. The optical systems of these instruments operate in accordance with the anaglyphic principle of stereoimage projection and have dual projectors which pass image producing light through red and blue filters, respectively. The projectors are suitably mounted in elevated position to direct their filtered light images in overlapping relationship onto a reflective surface of a viewing platen fixed to an underlying tracing table structure of the type described in above-identified patent to H. T. Kelsh. The platen is viewed through red and blue filters fixed in spectacles, or the like, whereby the filters are separately located in the lines of sight to the respective eyes of an operator. In this manner a stereoscopic model can be observed in association with a floating dot or point produced within the platen by an internal light means as more fully described in the aforesaid patent to H. T. Kelsh. Displacement of the tracing table to maintain the dot or point at a preset level in the stereoscopic model facilitates the drawing of contour lines on topographic maps over which the tracing table is moved. An anaglyphic optical system has a number of limiting drawbacks including the need of a light balance which must be carefully controlled for maximum stereovision, depending on the relative position of the viewing platent with respect to the two projectors. Anaglyphic projection also reduces the light reaching the viewing platen by approximately 75 percent, such that light fall-off in the projected model corner areas can become a significant restriction to its use. Similar limitations as to applicable light become evident in the use of alternative filter structures such as the polarizing devices described in Patent No. 2,492,870, issued Dec. 27, 1949, to H. T. Kelsh. Further, the selective filtering required to effectuate the stereoscopic model of anaglyphic projection rules out its application to colored photography. The present invention is operative to produce a stereoscopic model permitting up to half the available projected light to be viewed by the operator without further reduction due to anaglyphic filters worn by the operator, and facilitates the production and viewing of such model in true color as well as black and white. This improved operation is accomplished by adapting unique projecting and viewing mechanisms, which facilitate the functioning of an optical system based on the alternate intermittent lighting principle of stereoptic projection, to operate as integral parts of the aforesaid mapping instruments in place of the anaglyphic expedients thereof.

Each projector mechanism of the optical system according to the invention comprises a rotatable cylindrical shutter component operatively disposed with respect to a light source so as to intermittently pass and cut off projected light. Moreover, the projector mechanisms are alternately effective to project light in such intermittent fashion so that the light of one projector is cut off any time the other transmits light passing through the shutter associated therewith. A further cylindrical shutter structure operatively disposed to rotate in a viewing mechanism is formed with two sets of spaced openings. The openings in the respective sets are located out-of-correspondence around the shutter's cylindrical surface such that their displacement across an extended sighting window in a housing containing the shutter structure allows light coming from one of the projector mechanisms and reflected from the platen through openings in one of the sets to reach only one eye of the operator whereas light coming from the other projector mechanism and reflected from the platen through openings in the other set to reach only the other eye of the operator, and in each case the reflected light is cut off from reaching the opposite eye of the operator by a solid portion of the shutter structure aligned with each opening passing across the window. Operation of the projector and viewing mechanisms to obtain the perfected stereoscopic model made possible by the invention is accomplished by driving the respective shutters with positive shaft positioning motors in a manner which is synchronous with respect to both speed and position. An exacting control is used to obtain a requisite coordination of the relative positions of the shutter openings in the several mechanisms whereby these openings remain fixed in proper alignment after they are once set, and light from one of the projector mechanisms is invariably sharply cut off anything the platen is exposed to light from the other projector mechanism.

An object of the present invention is to provide mechanisms for operative association in an optical system producing a substantially brighter stereoscopic model in a stereoscopic plotting apparatus.

Another object of the invention is to provide an optical system facilitating the production of a stereoscopic model in true color over the entirety of the viewing plane.

A further object of the invention is to provide an arrangement for an optical system in a stereoscopic plotting apparatus allowing an operator thereof an increased range of sighting positions by accommodating all eye bases with respect to a viewing mechanism from which to observe the stereoscopic model.

Other objects and advantages of the present invention will become more fully apparent from the following description of preferred embodiments of the invention, considered together with the accompanying drawing wherein.

Figure 6:
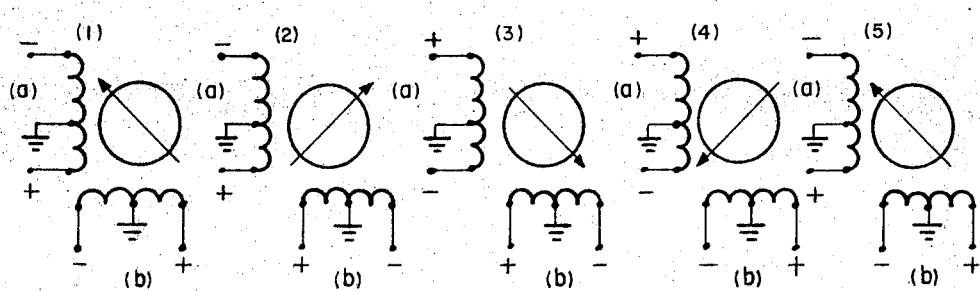
FIG. 6 is a schematic representation of the operational characteristics of a stepping motor having utility in the mechanisms shown in FIGS. 2 to 5.
Figure 7:
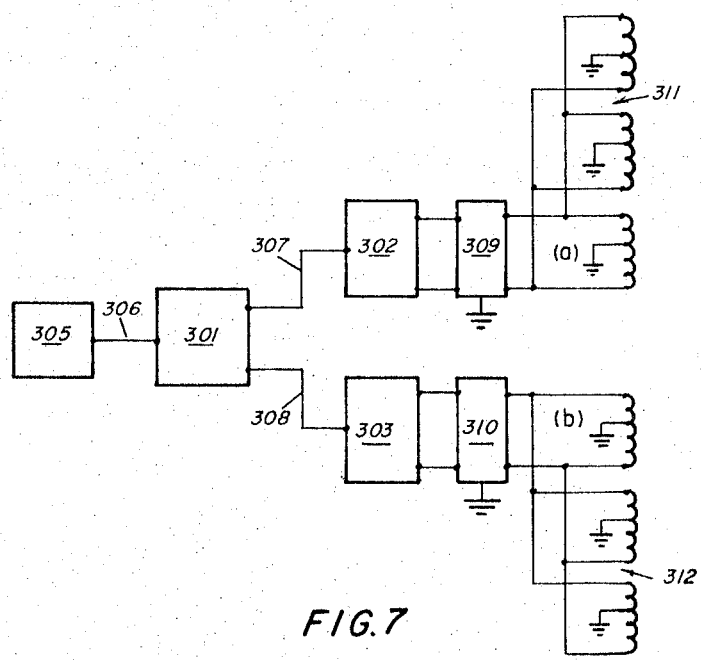
Figure 8:
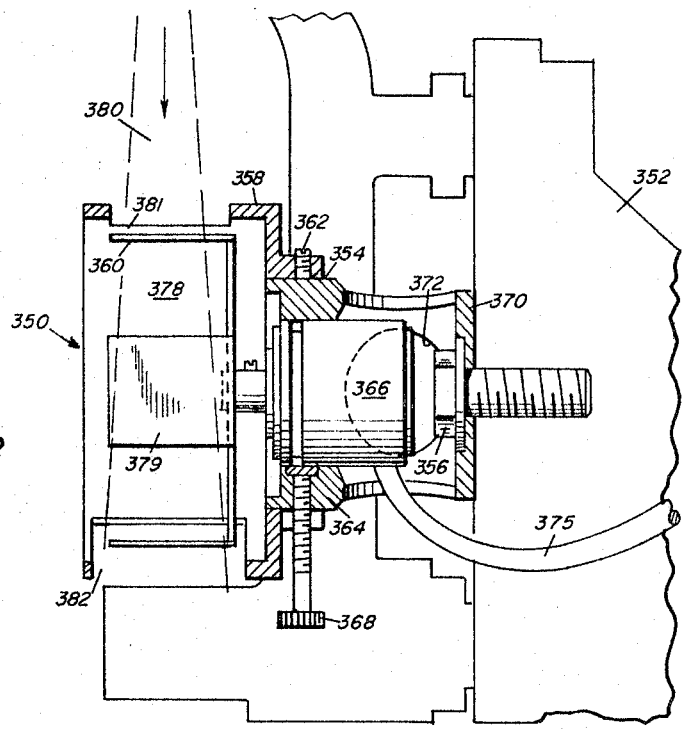
Figure 9:
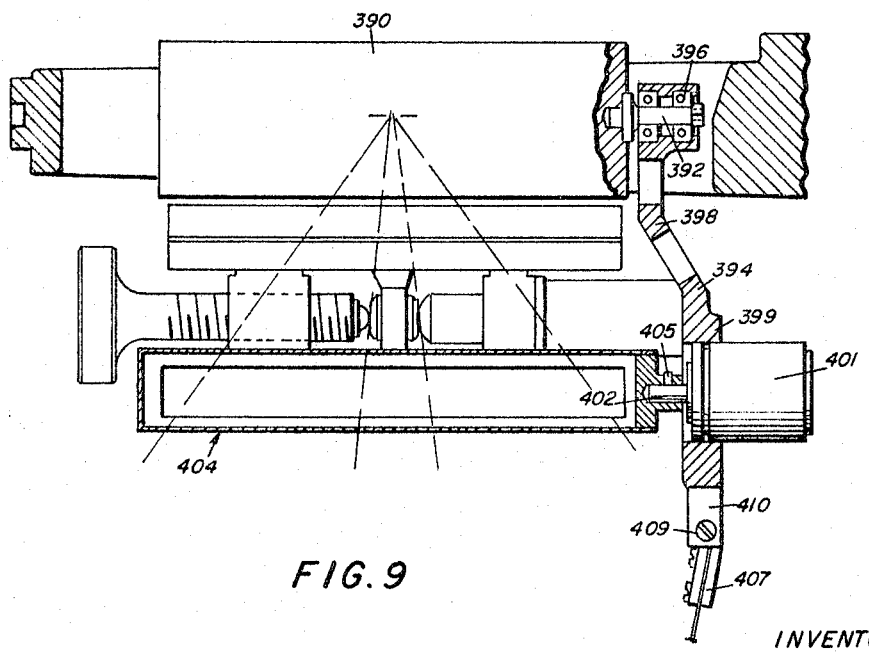
Figure 10:
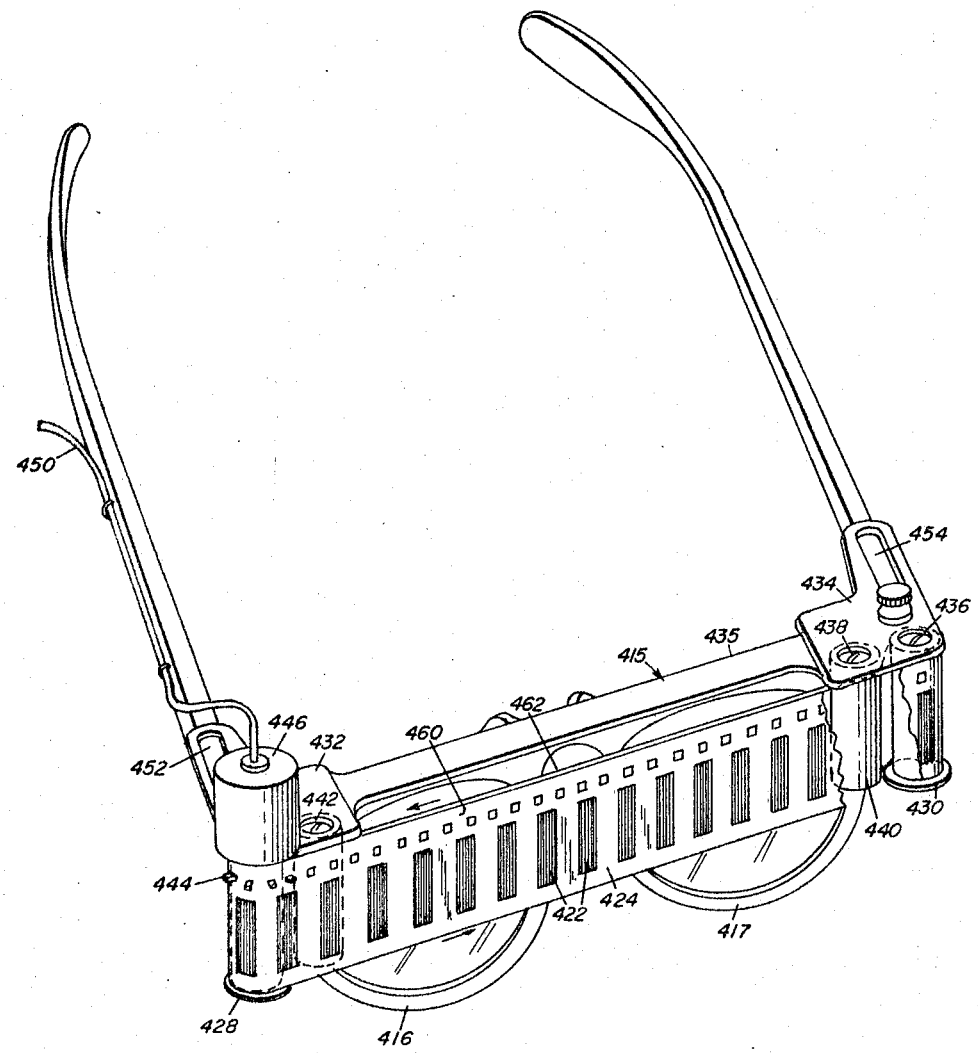

FIG. 7 schematically illustrates a circuit arrangement for controlling the operation of motors such as are represented in FIG. 6;

FIG. 7 schematically illustrates a circuit arrangement for controlling the operation of motors such as are represented in FIG. 6;

FIGS. 8 and 9 are respective views, partly in section, of two further embodiments of a light projection control structure having utility in the present invention; and FIG. 10 is a generally pictorial showing of a further embodiment of a viewing mechanism having utility in the practice of the present invention.

Figure 1:
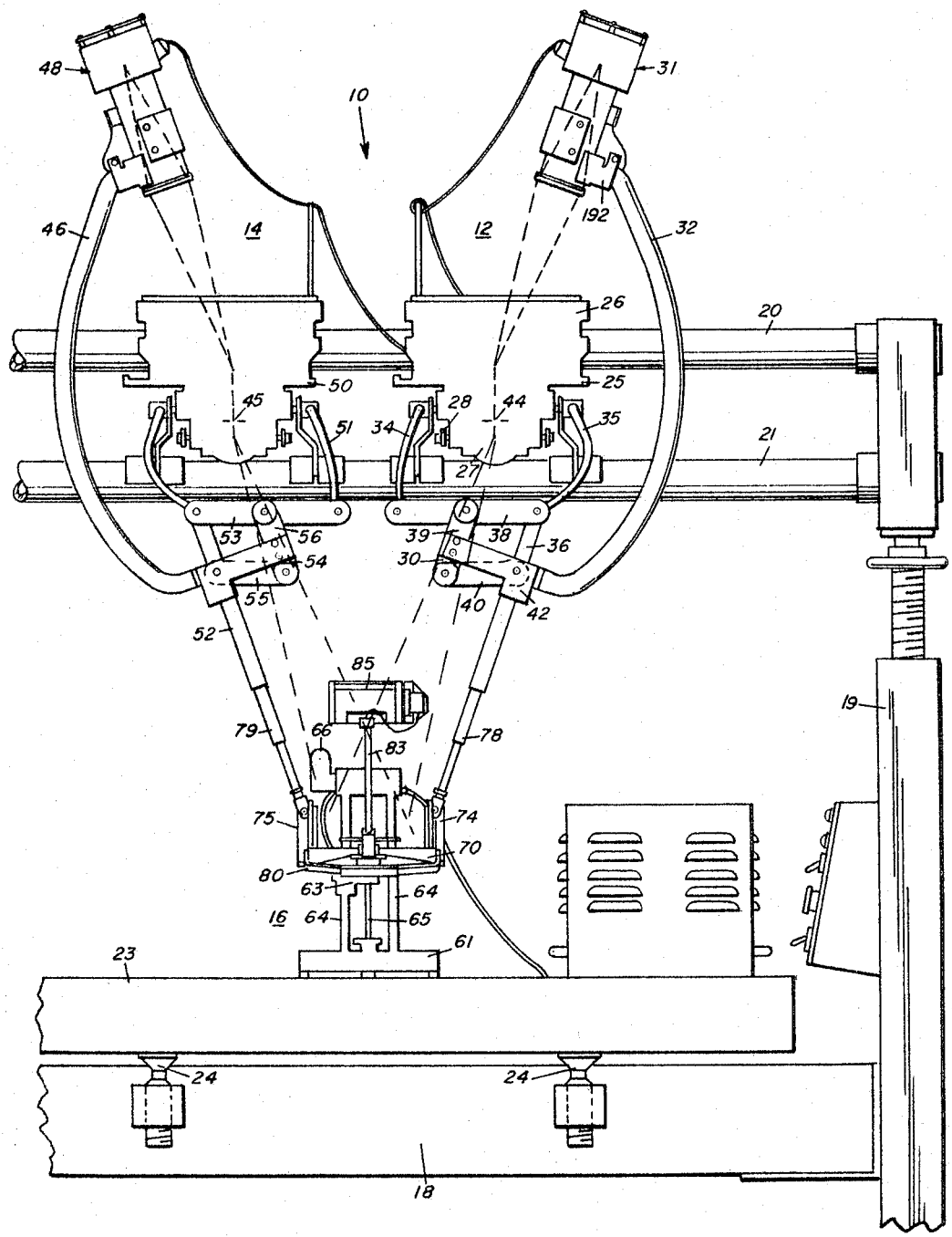
FIG. 1 shows a partial elevational view of a stereoscopic, photogrammetric plotting apparatus comprising the optical system structure of the present invention.

Referring to the FIG. 1 showing of a stereomapping apparatus 10, the present invention is seen operatively associated in this apparatus as component parts of a pair of projection units 12 and 14 appearing to the right and left of the figure, respectively, and a tracing table unit 16 set out below the projection units in the usual manner. In this partial showing of apparatus 10, its basic support structure is represented by an underlying frame 18, and a right side standard 19 of a pair of such standards which support horizontally disposed cross-bars 20 and 21 above a work table 23 resting on adjustable mounts 24 fixed to the base frame. Right-hand projection unit 12 comprises a generally rectangular, inverted frustopyramidal hood structure 25, having fixed to its top a frame member holding a diapositive photographic plate 26 bearing an image that is to be projected, and in a bottom opening thereof a projector lens system 27. Hood structure 25 is supported at its base in a gimbal arrangement 28 constituting an integral part of a block-like carriage comprising grooved tracks and pads resting on cross-bars 20 and 21 which function as guide rails on which the composite structure is displaceable. Joined to gimbal arrangement 28 by an articulate connection is a parallelogram linkage 30 which controls the operative displacement of a special illumination mechanism 31 fixed to an extended end of an upwardly curved carrier arm 32 whose opposite end is attached to the linkage. Equal, opposite links comprising the quadric chain of parallelogram linkage 30 include side lever 34 and a segment 35 of an extended arm 36 corresponding to lever 34, which depend directly from the articulated connections at gimbal 28, and a cross bar 38 pivotally connected to the ends of lever 34 and segment 35 which is parallel to the fixed link of the chain between the articulated connections. This parallelogram is compounded by a second such chain comprising side lever 39 and a further segment of arm 36 corresponding to lever 39, and joined by a cross bar 40, parallel to bar 38. A bracket 42 which clamps to the end of carrier arm 32 and fastens to lever 39, joins the arm to the linkage as was previously indicated.

Left-hand projection unit 14 comprises elemental parts which match those previously identified in describing projection unit 12. However, as is evident from the showing in FIG. 1, the structure of unit 14 is correspondingly arranged in an opposite relationship with respect to the structure found in unit 12. Thus, carrier arm 46 of unit 14 is disposed to the left so that illumination mechanism 48 of the unit is guided to beam light which converges with light supplied from illumination mechanism 31. A gimbal arrangement operatively associated with a laterally displaceable support structure 50 for a photographic plate and projection lens in unit 14, also comprises pivotal connections attaching thereto a pair of spaced curved arms 51 and 52 which in pivotal connections with further links 53, 54, and 55 constitute a compound parallelogram linkage 56 having the operational characteristics of linkage 30, and to which is joined carrier arm 46.

Tracing table unit 16 includes a conventional tracing table of the type disclosed in the previously identified Patent No. 2,833,178 to H. T. Kelsh. Comprising the tracing table are a pedestal base 61, an elevator structure 63 vertically displaceable on posts 64 by the drive from a threaded shaft 65 engaging threads in a block constituting the rear portion of the elevator. A collar member centrally situated in the forward part of elevator 63 provides a socket in which is secured a post element supporting a viewing platen 68. A generally rectangular open frame structure 70 is rotatably mounted by ball bearing means on the collar immediately below the viewing surface of the platen. Coordinated bearing components 74 and 75, assembled on the opposite sides of frame structure 70, support for universal movement relative to the tracing table telescopic arms 78 and 79, which comprise the extended ends of arms 36 and 52, respectively. Brackets fastened to pivotal supports bearing components 74 and 75 have attached thereto a longitudinal rigid bar 80 which extends forwardly, or toward the operator's station, in spanning frame structure 70. Bar 80 functions to stabilize the requisite alignment of arms 36 and 52 when they are operated to guide displacements of illumination mechanisms 31 and 48 to follow the movements of tracing table unit 16 as it is used to traverse work table 23 in a manner well known in the art. A pivotally adjustable bracket 82, fixed centrally to a forward part of frame structure 70, fastens to this structure a telescopic rod 83 which extends above and adjustably inclined away from platen 68 to permit viewing of the tracing table platen from any station of observation. Clamped to the upper end of rod 83 is a special viewing mechanism 85, to be hereinafter described in greater detail with reference to FIG. 5. By means of the interconnections heretofore described, illumination mechanisms 31 and 48 are operatively maintained by their units above the photographic plates associated therewith and positionable by the disposition of the parallelogram linkages 30 and 56 in response to displacements of tracing table unit 16. Since these illumination mechanisms are thus constrained by the linkage connections to follow tracing table movements, the light projected on platen 68 is at all times properly directed through the respective apertures 44 and 45 of the lens systems in support structures 25 and 50, as shown in FIG. 1 by the outlines of cones of light passing through these apertures.

Figure 2:
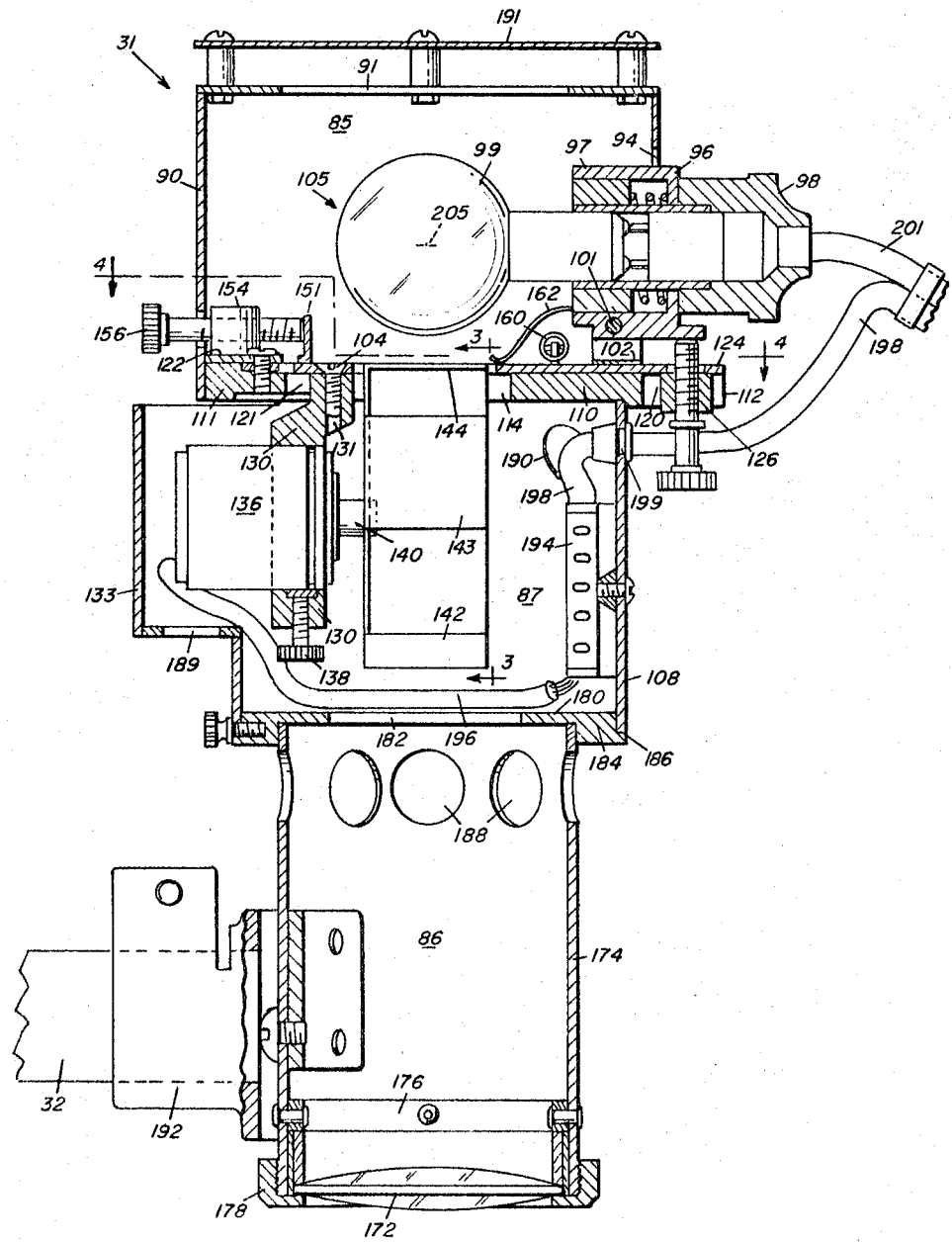
FIG. 2 is a generally sectional, elevational view of a light projecting mechanism having utility in the optical system of FIG. 1.
Figure 3:
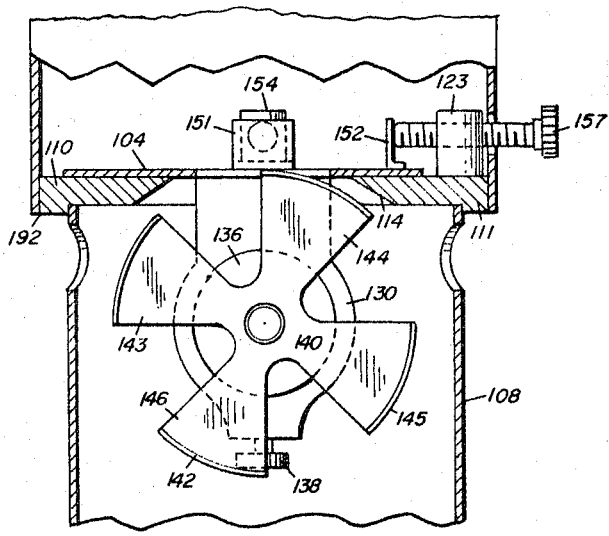
FIG. 3 is a partly sectional view of a segment of the projecting mechanism taken on line 3—3 of FIG. 2, which particularly shows the shutter member in the mechanism.
Figure 4:
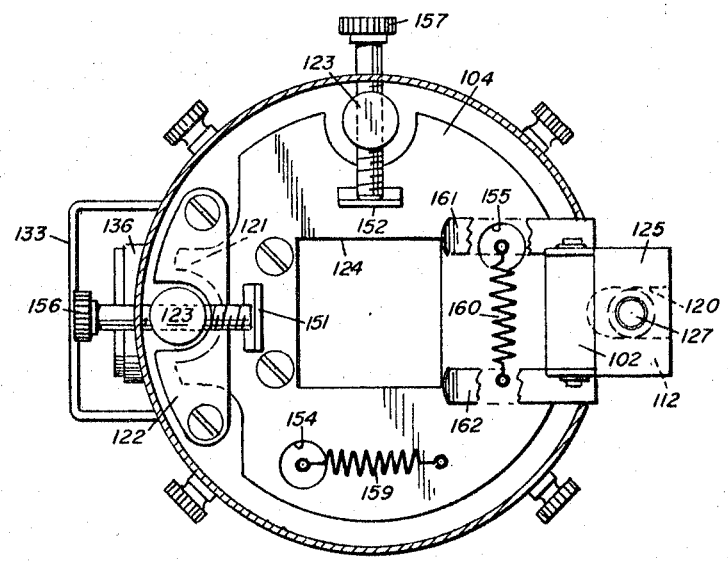
FIG. 4 is a partly sectional plan view of the light projecting mechanism taken on line 4—4 of FIG. 2, and particularly shows an adjustable support structure for the lamp and shutter devices of the mechanism.

Since projecting mechanism 31 and 48 are identical in every respect, a disclosure therefor is provided herein by reference to an explanation of only projecting mechanism 31, as illustrated in FIGS. 2 to 4. Turning to FIG. 2, projecting mechanism 31 is seen to comprise a lamp section 85, a condenser lens section 86, and a shutter section 87 situated in between the illumination and lens structures. Section 85 includes a cylindrical enclosure 90 having end openings 91 and 92 at its top and bottom, respectively. In a relatively wide slot 94 formed in the cylindrical surface of enclosure 90 and extending through its opening 92, is fitted a lamp assembly 96. A ferrule 97 of assembly 96, receives therethrough for support therein an extension sleeve of a socket component 98. Socket component 98 is resiliently maintained in ferrule 97 for rotation with respect thereto whereby the filament of a lamp 99 coupled to the socket can be oriented to totally fill the lens aperture of the projector system in unit 12. Ferrule 97 is pivotally mounted on a pin 101 passing through a hole in an enlarged segment thereof, and having its ends fixed in ears of a journal bracket 102 secured to a tie plate 104 of an illumination control assembly 105. As will hereinafter become more fully apparent, the several operative parts which constitute assembly 105 are arranged by attachment to plate 104 to purposefully locate illumination source 99 with respect to a shutter mechanism operatively disposed on the plate within shutter section 87.

Shutter section 87 comprises a cylindrical housing 108 over whose top edge is securely fitted a cap-like cover element 110. A peripheral portion of cover 110 is characterized by a narrow flange 111 and a rectangular extension 112. Centrally located in cover 110 is a generally rectangular opening 114. As is evident in FIGS. 2 and 3, the peripheral surface of flange portion 111 is accommodated within base opening 92 of lamp enclosure 90, and secured to the enclosure by a plurality of thumb screws, such as element 115, seen in FIG. 4. Extension 112 of cover 110 projects through the enclosure's slot opening 94 when sections 85 and 87 are united. As viewed in FIG. 4, tie plate 104 is seen to be generally circular and having a relatively large square opening 124 formed at a central location thereon. An integral part of plate 104, constituting a rectangular segment 125, extends through slot 94 of the enclosure so as to overlie extension 112 of cover 110. Fixed to segment 125 is a short spacer 126 which resides in a slot 120 passing into the outer end of extension 112. A snap washer fitted to the extended end of spacer 126 is adapted to slide over slot 120 whereby the end of plate 104 adjacent thereto is maintained in contact with cover 110. The circular form at the opposite end of plate 104 is diminished on two sides to fashion a short tongue 121 which underlies a strap 122 fastened to cover 110 and suitably spaced above the cover to receive tongue 121 in a sliding fit. A bolt 127 engages within a threaded hole through spacer 126 from below and is thus adapted to project therefrom and over plate 120 so as to contact a projection on ferrule 97. It is evident that adjustment of bolt 127 sets the limits of pivotal displacement of lamp assembly 96 about pin 101.

Two arcuate indents ninety degrees apart on plate 104 receive within portions thereof screw posts 123 which are fastened into cover 110. Posts 123 contain screws 156 and 157, respectively, which are adjustable therein to bring their pointed ends against tabs 151 and 152, respectively, fixed to plate 104 so as to face these screws. Pins fixed to cover 110, and which separately project through the respective small circular openings 154 and 155 in plate 104, constitute anchors for springs 159 and 160 which extend to respective connections at further pins fixed in the plate. As best seen in FIG. 4, each of the diminished and cut away portions of plate 104, including the detents and circular openings therein, are sufficiently enlarged about the elements fixed to cover 110 and are disposed within such plate portions, so as to permit the plate to shift about to a limited extent over the face of cover 110. Accordingly, springs 159 and 160 are arranged by their pin connections to bias plate 104 in perpendicular directions whereby tabs 151 and 152 bear against the screws in posts 123 and 124. Also provided to bear on plate 104 are the extended ends of a pair of curved leaf springs 161 and 162, which have their anchored ends supported at opposite sides of ferrule 97 whereby these leaf springs act to maintain lamp assembly 96 pressed against its adjusting screw 127.

Referring particularly to FIG. 2, where plate structure is seen disposed over cover opening 114 adjacent an end thereof, there is also evident a collar clamp bracket 130 which is attached to the underside of plate 104 by flathead screws 131 fastened in an offset flange of the bracket. Bracket 130 is thus disposed to extend fully into housing 108 wherein a circular opening of its collar clamp is maintained parallel to the housing axis. Facing the collar opening is an outwardly protruding section of housing 108 formed by a generally rectangular coverture 133 fastened to the housing and opening therein. A stepping motor 136 having a forward end of the casing thereof fitted within the collar opening is thereby disposed to place its rearward portion in the housing section defined by coverture 133. A clamping screw 138, passing through the extended end of bracket 130, is adjustable therein to press a lock shoe which securely fastens motor 136 in the collar opening.

Attached to a shaft 140 at the front end of motor 136 is a shutter member 142. As best seen in FIGS. 2 and 3, member 142 comprises an arrangement of four spaced-apart, identical arcuate vanes 143 to 146, having corresponding widths and spacing so as to constitute in the member a basically cylindrical element around which are uniformly alternated the segments and spaces between them. Vanes 143 to 146 are supported as integral parts of spoke-like sectors radiating from a hub portion which together with the sectors form an end wall 147 of shutter 142. Shaft 140 is centrally attached in the hub of wall 147 by a suitable fastening such as set screws. Shutter 142 is thus maintained approximately centered in housing 108 and positioned to allow unobstructed rotation thereof. Moreover, when this shutter is properly located the spin axis thereof and the peripheral elements of its arcuate vanes are parallel to the surface of plate 104, and by rotating the shutter carries such elements to pass within openings 114 and 124.

Lens section 86 is essentially a support structure or mount for a condenser lens 172. This structure comprises a projector tube 174 wherein lens 172 is maintained with suitable positioning spacers between an annular frame 176 fixed to the inner wall of tube 174 by rivets or the like, and a retainer ring or bezel 178 screwed onto the outer rim surface at the extended end of the tube. The opposite end of tube 174 is tightly fitted within a shallow depression on one side of a disk-like member 180, whereby a relatively large central opening 182 in the member is axially aligned with the end openings of the tube. Tube 174 is thus also encircled by an annular flange 184, forming the outer rim of member 180, whose peripheral surface is defined by a reduced portion ending in a shoulder 186. The rim of the further end opening of shutter housing 108 slips over the reduced portion of flange 184 and rests on its shoulder 186. A knurled screw in the wall of housing 108 fastening into flange 184 retains the projector section 86 connected to shutter section 87, in an obvious manner. A number of small openings 188, 189 and 190 spaced around tube 174 and housing 108, are effective in association with opening 91 in enclosure 90 to allow air heated by lamp 99 and motor 136 to pass out of the projecting mechanism to obtain circulation of cooling air therein. A plurality of spacer fastenings are provided to secure a protective plate 191 to enclosure 90 an appropriate distance from opening 91. A clamp bracket 192 fastened to the cylindrical surface of tube 174 provides a connector which attaches an end of a carrier arm, such as shown in FIG. 1 extending from the parallelogram structures, to the illumination mechanisms. A further component of the mechanism is an electrical terminal block 194 which is mounted on an inside surface of housing 108. Electrical leads to motor 136 are tucked around inside housing 108 within a harness 196 from which such leads enter block 194 for attachment to terminal connections therein. Input and control potentials for motor 136 are supplied through the terminal connections and a cable 198 which leaves the housing through a grommet 199. A separate power connection is made available for energizing lamp 99 by way of a cable 201.

As is evident from the showing in FIG. 2, shutter member 142 is operatively located in the path of light which emanates from a filament 205 of lamp 99, and extends through openings 124, 114, and 182 to reach condenser lens 172. Precise control of the light by shutter member 142 normally requires that a predetermined relative disposition between lamp 99 and shutter member 142 not be disturbed. Accommodating a lamp replacement in socket part 98 may require a minor displacement of the lamp filament with respect to the projection lens to restore the focus of the filament within the aperture of the lens. Socket 98 is therefore pivoted on pin 101 by adjusting screw 127 to improve the focus as indicated. It may thus also become necessary to reestablish the centering of the lamp and shutter components relative to the lens aperture. Accordingly, these components are adapted to be moved together with plate 104 to which they are fixed by lamp bracket 102, and motor and shutter hanger bracket 130, respectively. Small lateral and pivoted displacements of plate 104 over cover 110 by adjusting screws 156 and 157, respectively, are guided and defined by the disposition of spacer 126 which, as was hereinbefore explained, is fixed to the plate and limited to linear displacement by cover slot 120. In turn, springs 159 and 160, which draw the plate's pads 151 and 152, respectively, against the adjusting screws in contact therewith, facilitate a precise adjustment of plate 104, and the subsequent maintenance thereof.

Figure 5:
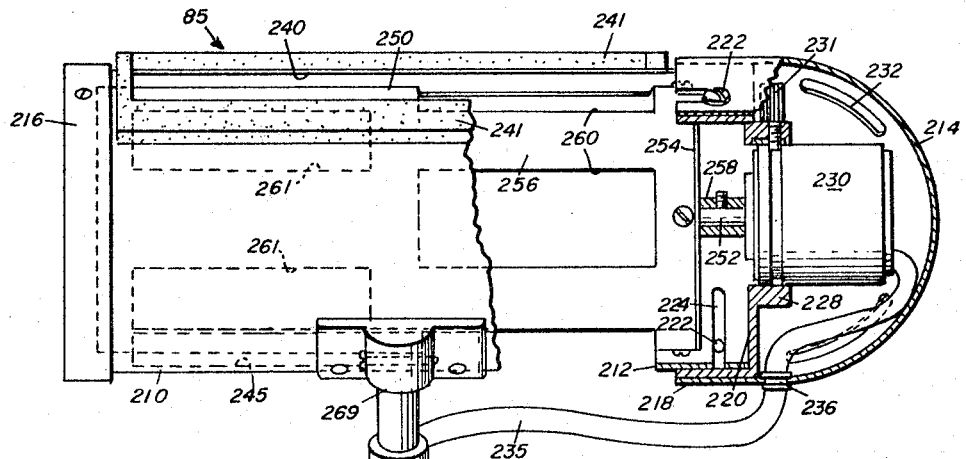
FIG. 5 is a partly sectional elevational view of a viewing mechanism having utility in the optical system of FIG. 1.
Figure 5:
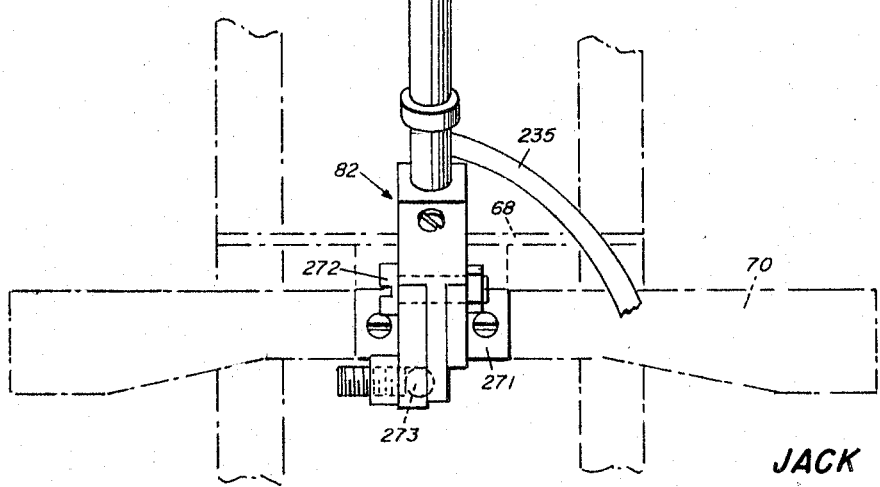

Referring to FIG. 5, the details of viewing mechanism 85 are seen as including an exterior shell 210 comprising an elongated tubular casing 212 over whose opposite end openings are affixed a generally hemispherical closure cap 214 and a plane closure cap 216, respectively. Closely fitted over one peripheral edge of casing 212 and inside of a short cylindrical extension 218 of cap 214, is a conforming edge portion of a circular frame 220 constituting a partition within shell 210 between casing 212 and the space enclosed by hemispherical cap 214. Screws 222, provided to fasten cap extension 218 to the conforming edge of frame 220, project through circumferential slots 224 in casing 212. A limited rotation of cap 214 together with frame 220 about the axis of casing 212, and with respect thereto, is facilitated by this construction. A substantial central opening in frame 220 is distinguished by a flanged collar 228 constituting an integral part of the frame. The opening in frame 220 is filled by the forward part of a stepper motor 230 which is secured to collar 228 by a clamp screw 231 adjustable therein on a lock shoe. The larger part of motor 230 extends into the concavity defined by hemispherical cap 214 around which a multiplicity of circumferential slots 232 are regularly spaced to provide ventilation for the motor. Electrical leads connected to motor 230 are carried thereto in cable 235 which extends through a grommet 236 in cap 214.

A relatively wide, elongated slot opening 240 extending across approximately the full length of casing 212, parallel to the axis thereof, is provided with a soft plastic foam rectangular head rest 241 which is secured to the outer surface of casing 212 so as to border slot 240. A further similar slot 245 is fashioned in casing 212 to extend across an area thereof which is diametrically opposite to that in which slot 240 is formed. Shell 210 contains an apertured drum structure 250 which is supported for rotation with respect to shell casing 212 by a shaft 252 projecting from motor 230. A carrier disk 254 to which a cylindrical apertured component 256 of drum structure 250 is attached by screws in a conventional manner, comprises a short axial coupling socket 258 in which shaft 252 is fastened by a set screw. Eight substantially rectangular apertures of equal size are fashioned in the cylindrical wall of drum component 256. As can be seen by reference to FIG. 5, these apertures are arranged in two circumferential bands 260 and 261 each of which has four apertures regularly spaced apart a distance equal to the width of an aperture. Also evident is the out-of-phase relationship of the spaced apertures in the two bands wherein each aperture of a band has juxtaposed thereto a solid portion of the other band. Accordingly, at any time during a step-wise rotation of drum structure 250 that an aperture in either one of its bands is aligned with one or the other of an approximate one-half of casing slot 240, only an aperture diametrically opposite to the aperture so aligned will itself be aligned with slot 245 across a corresponding approximate one-half of the length thereof whereas solid areas of the other band will block those portions of slots 240 and 245 extending across the remaining approximate one-halves thereof.

Viewing mechanism 85 is maintained operatively disposed with respect to tracing table platen 68 by means of the previously identified telescopic support rod 83 and bracket 82 which fastens the rod to rotatable frame structure 70 of the tracing table. Rod 83 is joined to the viewing mechanism by a suitably contoured bracket 269, which is fastened centrally to the cylindrical face of the mechanism's casing 212, and comprises a socket part wherein the extended end of the rod is received and secured. Bracket 82 is seen in FIG. 5 to comprise a pivot block 270 into which the base end of rod 83 is fitted and secured. A tongue segment of pivot block 270 is disposed to pivot with respect to a fixed hinge block 271, on a bolt 272 projecting through these parts and fastened by a nut in a conventional manner. A spring pressed ball detent device 273 is attached to an extended portion of the forked segment whereby the detent acts in depressions on the pivot block. Hinge block 271 is fixed to a mounting ring fitted into a counterbore of part 70 which permits lateral angular adjustment for viewing convenience. It is thus evident that rod 83 is extensible, and pivotable in a vertical plane for positional adjustments with respect to platen 68, as well as rotatable in a horizontal plane with respect to support frame 70. In addition to the evident flexibility the invention allows in connection with positioning viewing mechanism 85 as may be necessary to facilitate a suitable point of observation of the stereoscopic model, the simple elongated slot opening 240 which the mechanism provides for viewing the model readily accommodates any eye base which an observer may have. This construction thus distinguishes over binocular or separate eye piece arrangements which normally require initial adjustments for eye base when used by different observers.

In operation, projecting mechanisms 31 and 48 direct light beams through predetermined areas of the photographs mounted in support structures 25 and 50, whereby focused light image projections of these areas are received on the viewing surface of platen 68. As was previously mentioned to be well known in the stereoscopical art, and explained in British specification No. 754,649, dated Dec. 23, 1954, two projections of this sort can be seen as a stereoscopic image when they are separately filtered through differently colored (blue and red, or green and red), mediums and viewed through spectacles having correspondingly differently colored glasses. However, the aforesaid British specification specifically relates to yet a different stereoscopic system employing electric gas discharge lamps for alternately illuminating each of a pair of photographs and shutter means through which an observer's view of the platen scene is alternately obturated at a frequency in synchronism with the frequency of illumination of the photographs. Current from A.C. means is supplied to half-wave rectifiers, connected in parallel, which are alternately effective to energize the lamps. The shutter is a disk having two diametrically opposite peripheral cut-outs and is driven before the eyes of an observer by a synchronous motor connected to the A.C. mains. Since the shutter is driven synchronously with the flashing of the lamps the observer sees in one eye an image derived from one of the photographs and in the other eye the image derived from the other photograph. The two images will thus be seen by the observer as if they are merged wherefore a stereoscopic image is made to appear.

The cited concept based on alternating projections is also fundamental to the present invention. As disclosed herein, the invention relies on the respective shutter members of illumination mechanisms 31 and 48 to determine the alternate projections of the photographic images, and on an apertured drum in viewing mechanism 85 to limit viewing of the image produced in right hand mechanism 31 to the observer's right eye, and that produced in left hand mechanism 48 to the observer's left eye. The stereoscopic model thus produced is not restricted to gas discharge lamps and can utilize any concentrated or point light source to provide a considerably brighter imagery requiring a minimum of light balance to achieve good perception. The advantageous operation of the invention is enabled by its unique shutter arrangements and precision control of the shutter drives. Basic to this precision control for the preferred embodiment is the utilization therein of magnet stepper motors. Motors 136 and 230, shown in FIGS. 2, 3, and 5, are exemplary of such motors, which are miniaturized and comprise a permanent magnet rotor and a wound stator. Fuller disclosures of motors of this type are given in Patent No. 3,117,268, issued Jan. 7, 1964, to E. W. Madsen, and Patent No. 3,267,346, issued Aug. 16, 1966, to M. M. Liang et al. Other motors having possible utility in connection with the invention include the polarized hysteresis motor such as described in Machine Design of Aug. 18, 1966, on pages 165 to 167. By properly switching the current to the stator windings, the rotor can be given step-wise rotational motion with magnetic detenting to hold it in position when energized. As illustrated in FIG. 6, representing the requisite switching as alternate reversals of excitation polarity at the input connections to the stator windings, four 90 degree angle steps of the rotor provide a shaft displacement of 360 degrees. Stepping rates for such stepper motors can be as high as 300 pulses per second under no load conditions whereby the motors operate in a synchronous manner at any speed up to 4200 r.p.m.

Positive registration of an individual motor output shaft with respect to a pulsed sequential input attains four distinct preferred rotor positions as indicated in FIG. 6. It is evident that pulsing the two projecting mechanism motors and the viewing mechanism motor with the same pulse sequence results in positive shaft positioning in a manner which is both synchronous with respect to speed and rotation. The rotors cannot reposition themselves without reorientation of the field polarity which can only occur on command from the control inputs. A standing pattern for such polarity changes is evident from the states of the stator polarity characterizing the five steps of rotor displacement represented in FIG. 6. To effect the step drive between positions 1 and 2, the polarity of stator $b$ is switched; between positions 2 and 3, the polarity of stator $a$ is switched; between positions 3 and 4, the polarity of stator $b$ is switched; and between positions 4 and 5, the polarity of stator $a$ is switched. Consequently, to obtain a constant rotation of the rotor by a uniform stepwise drive it is necessary that repeated switching sequences be effectuated wherein polarity switch control pulses are alternately applied to the respective stator windings.

Requisitely controlled sequences of field switching potentials can be supplied to the respective stators by relatively simple arrangements of conventional flip-flops and a triggering pulse source. An elemental form of a representative arrangement is shown in FIG. 7 to include flip-flops 301, 302, and 303, which can be of the type disclosed on page 190 of the General Electric Co. Transistor Manual, 7th Edition (1964), which receive triggering pulses at a single input terminal and conduct alternately at two output terminals. Outputs from these flip-flops have characteristics suitable for triggering other similar flip-flops. Triggering circuit 305 shown in the figure can also be of conventional design, examples of which are found on page 200 of the above-identified Transistor Manual. A train of uniform pulses applied to lead 306 are received in flip-flop 301 which responds thereto by supplying output pulses alternately on leads 307 and 308. Flip-flops 302 and 303 receive these pulses on leads 307 and 308 at their respective input terminals and are alternately triggered thereby to switch the relative state of the potential on their respective output leads. Accordingly, stators $a$ and $b$ which are in circuits receiving the changing outputs of flip-flops 302 and 303, respectively, have their excitation polarity switch in correspondence with the alternate triggering of these flip-flops. A coordinated control for the three stepper motors used in the preferred embodiment is attained by the obvious expedient of supplying the respective outputs from flip-flops 302 and 303, through suitable amplifier means 309 and 310, and across parallel circuits 311 and 312, comprising the $a$ and $b$ stators of these motors, respectively.

An appropriate relative displacement between the open spaces in the respective shutter members of the illumination mechanisms may be needed to accomplish the desired alternate light image projections. Since each shutter member is formed with four openings and four blocking vanes, it is evident that one such member leads or lags the other by 45 degrees in order that the passage of light be initiated in one of the mechanisms the instant light from the other is completely blocked. For example, consideration of FIGS. 2 and 3, where shutter member 142 is seen in position to completely block the passage of any light and further rotation of the member clockwise, as viewed in FIG. 3, will open the optical path through the illumination mechanism, indicates that the shutter member in illumination mechanism 48 must be positioned to initiate the obstruction of the light path through the mechanism. An appropriate adjustment of viewing mechanism drum component 256 with respect to viewing slot 240 in casing 212, must also be considered to insure proper synchronization between the switching of its unobstructed sighting paths and the alternations of the images projected on the platen. However, a calibration of the disclosed optical system is quite easily accomplished. Since the shutter members and the apertured drum are attached directly to the motor rotors associated therewith, adjustments to match operational phases in any one of these components only requires a rotation of the motor housing with respect to its mount. By observing the projected light from each projector separately on the tracing table platen, precise rotation of a shutter member motor is undertaken while it is running at operating speed until complete cut off of the light is noted in the area of viewing mechanism slot 240 related to the opposite band of apertures in drum 256. This procedure is then repeated with the second shutter member motor which results in complete separation of images from the two projecting mechanisms. The orientation of the shutter members are thus synchronized to match the left eye to the operation of the left projecting unit and the right eye to the right projecting unit which makes possible the mental fusion of stereoscopic images. Since the motors are all energized from the same pulse in a sequential manner, the motors automatically align themselves upon starting and remain synchronized in operation. No adjustment is required after the initial calibration. The motors can be stalled without damage and when released will again align themselves and operate synchronously. In this connection the angular displacement of cap 214 in the viewing mechanism, facilitated by slots 224 and casing 212, rotates motor 230 and apertured drum 256 therewith such that the drum apertures normally appearing in slots 240 and 245 can be changed to the alternate arrangement while the positions of the shutter members of the illumination mechanisms remain unchanged. This reverse phasing of the light control structure makes possible the viewing of the projected imagery in a pseudoscopic manner for the purpose of precisely locating a "floating point" with respect to the stereoscopic model in a manner well known in the art.

The operating speed of the motors is dependent upon the number of openings in the shutter members and apertures in the viewing mechanism drum needed to achieve the frequency of alternation of the light and dark phases of light emission to create the impression of a steady flow of light. A flash rate found to eliminate the flicker of the alternated image to the observer is approximately sixty light flashes per second. This flash rate is known as the critical fusion frequency and varies with the individual observer. A motor speed of 900 r.p.m. was determined to be suitable for systems utilizing shutter members having four open and closed areas, and a motor speed of 1800 r.p.m. was found effective for systems having shutter members with two open and two closed areas.

In the modification of the invention illustrated in FIG. 8, the shutter sections of the projecting mechanisms are located apart from the mechanism's illumination source and are separately attached to the parallelogram of the lamp guide arm assembly which controls the light path from a swinging lamp housing through the apertures of the lens to the platen. The devices of the shutter sections are thus situated between the projector lens and the tracing table platen where they perform in the light path carrying the photographic image radiating from the hood structures such as shown in FIG. 1 by component 25. As shown in FIG. 8, a shutter component 350 is affixed to a parallelogram structural part 352 of a conventional Belfort M–2 plotter. A composite housing 354, secured by fastening elements 356 to an appropriate surface of part 352, includes a cylindrical shell 358 containing a shutter member 360 fastened by set screw 362 to an apertured casing 364 containing a stepper motor 366. A portion of casing 364 contiguous to shell 358 constitutes a reinforced collar in which the front part of motor 366 is secured by a clamp screw 368 acting on a lock shoe. A hole in the casing's opposite end wall 370 receives fastening elements 356 including a washer and threaded bolt. Relatively large apertures 372 spaced around casing 364 provide the necessary ventilation for the motor and facilitate shutter calibration by manual adjustment of the motor. A cable 375 entering casing 364 through an aperture 372, carries the electrical connections to the stators of motor 366, hereinbefore described in connection with the showing in FIGS. 6 and 7.

Shutter member 360 comprises equally spaced open and closed areas designated 378 and 379, respectively, which when rotated, alternately interrupt the cone of light 380 being projected to the viewing plate through slots 381 and 382 in cylindrical shell 358. As was previously explained, light is thus interrupted and released on the axis of projection by the upper and lower vanes of the shutter which are 180 degrees apart. Shutter member 360 is one of two such members which are set 90 degrees out of phase with each other when rotated by their matched phase stepper motors whereby intermittent images are alternately displayed on the tracing table platen of the plotter. Since these shutter members open and close on the axis of projection, one image is completely baffled while the other shutter member goes through its phase of opening and closing, and is followed by a reverse functioning of the shutter members.

In the modification of the invention illustrated in FIG. 9 each shutter device is suspended from an annular flange 390 of a projector component of the type used in a multiplex or a conventional ER–55 or Balplex stereo-plotting apparatus such as shown in Patent No. 2,869,419, granted Jan. 20, 1959, to R. K. Bean. The shutter device is thus adapted to swing about the axis of the lens external node below the projection means and between the lens and tracing table platen. A stud shaft 392 which is screwed into the outer surface of flange 390 constitutes a support for an arm 394 suspended from a double race ball bearing 396 fitted on shaft 392. Arm 394 has an offset part 398 from which extends an enlarged portion fashioned as a collar 399 whose opening is parallel to the axis of flange 390. Securely fitted into collar 399 is the front end of a stepper motor 401 comprising a shaft 402. An elongated tubular, cylindrical component 404 has as an integral part of one end thereof a bushing 405 in which shaft 402 is fastened by a set screw. Component 404 has interspaced thereon two open and two closed identical areas extending across substantially the full length thereof whereby it is operative as a shutter member when rotated by stepper motor 401 to allow a full projection of the diapositive plate along one axis of the projected model.

The form of shutter member 404 admirably adapts it for use in a plotter, such as the Multiplex or ER–55, to interrupt a narrow band of the total illuminated field in the x-direction of projection, sufficient to fully cover the platen area while fully projecting in the y-direction. This type of projection arrangement has the entire disapositive plate imagery projected to the working datum. Consequently, by interrupting the entire y-segment only, a swing movement around the x-axis is required to selectively process in accordance with the invention any portion of the projected image. Complete image separation is attained with the shutter member below the lens. However, the relative swing position of the two projector devices must be maintained so that like areas of the stereoscopic model will be alternated. For this purpose one end of a roller tape 407 is attached to pivot on a screw pin 409 secured in a yoke-like bracket 410 formed on arm 394 at a point thereon along a line emanating from the swing axis of shutter 404. The other ends of the roller tapes are drawn from their containers which are pivotally mounted to the opposite sides of a frame structure locked to a tracing table platen. When these tapes are thus supported between the projector arrangements and a tracing table, they provide the necessary rigidity in the x-direction to maintain the shutter member position anywhere in the model. Rigidity in the y-direction for the tape is not needed. Shutter alignment without disturbing the projectors can be maintained by the tapes with a maximum spring tension of four ounces. This arrangement allows a total freedom of tracing table movement throughout the model area so as to afford a complete range of projection distances.

In the alternative form of viewing mechanism illustrated in FIG. 10, a spectacles' frame 415 constitutes a base component for the several light controlling members thereof. This frame comprises the usual rim elements 416 and 417 in which lenses can be secured by conventional means, and temple pieces 418 and 419 of a common design. Intermittent blocking of the lines of sight from a tracing table platen to the respective eyes of an observer is accomplished for this mechanism in the alternate manner, as was previously described, by an arrangement of opaque areas 422 on an endless belt 424 of flexible, transparent material such as a plastic film. Areas 422 are depicted in FIG. 10 as dark coatings in the substance of belt 424 which appear as a procession of aligned rectangles of uniform size that are individually spaced apart a distance corresponding to the width of an opaque area. An alternative form of such a marked belt can have an opaque film whereon clear areas of adequate size are appropriately arranged, or wherein cut-out windows are provided to allow light passing therethrough to reach an observer's eyes. Belt 424 is carried on a pair of spaced apart cylindrical spools 428 and 430. These spools depend from angular brackets 432 and 434, respectively, which are symmetrically arranged on the mechanism by their attachment at the extended ends of a cross-bar 435. A central opening in a counterbore on the top surface of bracket 434 receives therethrough a headed pin 436 which is fixedly attached to spool 430 so as to constitute a shaft permitting the spool to rotate freely below the bracket in an obvious manner. Extending down through another opening in a counterbore on bracket 434 is a further headed pin shaft 438 which rotatably supports an idler roller 440 adjacent to spool 430, and in parallel alignment therewith. A headed pin 442 in bracket 432 similarly supports an idler roller adjacent to spool 428.

A flange element topping spool 428 is formed as a sprocket gear 444 whose teeth are engaged in sprocket holes arranged on a margin along the upper edge of belt 424. A pin affixed to gear 444 is axially arranged thereon to constitute a rotatable shaft which passes upwardly through a bushing in bracket 432. The gear shaft is connected to a coaxial shaft on an attached stepper motor 446 by a coupling which facilitates a drive from motor 446 to turn gear 444, which in turn causes the displacement of belt 424 along with the rotation of the spools supporting the belt. Electrical wiring 450 for motor 446 is conveniently held aside by attachment to temple piece 418 with suitable fasteners. In the shorter arms of brackets 432 and 434 are formed elongated slots 452 and 454, respectively, wherein thumb screws are located which serve to fasten the brackets to frame 415 by engaging threads in parts of the temple pieces underlying the brackets.

As seen in FIG. 10, belt 424 comprises outer and inner sections 460 and 462 which move at the same time in response to the sprocket drive whereby they traverse in opposite directions the sighting field of the lenses in frame rims 416 and 417. The action of the idler rollers in operative association with spools 428 and 430, is to hold belt sections 460 and 462 relatively close to each other. Belt 424 is positionable with respect to the frame structure 415 by forward or backward adjustments of the belt support structure when the screws in slots 452 and 454 are loosened. Protection of the attached mechanism from dust and damage is provided by a covering case of light material (not shown) which fastens to brackets 432 and 434 in an obvious manner. Slots in this casing defining openings of sufficient size to allow varying degrees of sighting angles to the tracing table platen, function as a masking expediency to restrict extraneous light. However, since this viewing mechanism is normally used in subdued light, such distracting light is usually not a problem.

In the operation of the alternative viewing mechanism, one revolution of the motor rotor moves belt 424 to pass the same number of open and closed sections before the observer's eyes as those caused by one turn of the rotating shutters across the light cones of the projecting mechanisms so as to obtain the requisite synchronism between the projecting and viewing components which was hereinbefore described as characterizing the operation of the present invention. Belt 424 is adjusted toward or away from the rims of frame 415 as needed to fit the belt arrangement to any eye base which an observer may have. This adjustment is effective since the observer's eyes are directed along lines of sight converging toward the tracing table platen. In an exemplary construction wherein alternating areas of light passage and blocking are each one quarter of an inch wide, a sighting can be taken at about ten inches from the tracing table platen. Application of the mechanism as indicated initially requires that a dark area 422 be situated to obscure sighting by one of the observer's eyes while the other eye is free to sight through a clear space between blocking areas when sections 460 and 462 have their open and closed areas in matching alignment. Continuing movement of belt 424 is thereafter effective to alternately place before the respective eyes of the observer out-of-phase sequences of blocking and sighting areas defined by the markings on the belt.

Other applicable constructions which can secure displacement of a marked film in the requisite manner include mounting such film in frames which are reciprocable as slides on tracks in response to a drive by a cam rotating in suitable slots formed at one end of these frames.

While particular embodiments of the present invention have been illustrated and described herein, it will be understood that this invention is not limited thereto, but is susceptible to change in form and detail.

What is claimed is:

1. An optical system producing a stereoscopic image comprising a pair of light processing mechanisms, a viewing datum adapted to receive thereon light emanating from said mechanisms, a means supporting thereon diapositive conformations in cones of light including said emanated light whereby images from said conformations are created in said cones of light and caused to appear on said viewing datum, said mechanisms including dual means located in said cones of light and operative therein to alternately effect the disappearance of one of said images from said viewing datum and the subsequent appearance of the other image thereon, concurrently operable individual articulatory means connected to respective ones of said mechanisms enabling said dual means in said operation thereof to take predetermined arcuate displacements with respect to said viewing datum, an independently translatable viewing mechanism comprising means apportioned in two separated sections having arranged therein light passage elements through which is discernible by respective ones of the eyes of an observer said light image appearing on said viewing datum, said apportioned means being operatively supported in said viewing mechanism whereby light passage elements of each said section thereof functions to alternately effect viewings and blockings of said sighting of said appearing image by the respective eyes of the observer, and means commonly controlling said dual means and said opportioned means to operate in a synchronous, positive positioning manner with respect to each other.

2. The optical system of claim 1 wherein each said light processing mechanism is a controlled light projecting device, and each said dual means comprises a shutter member having a multiplicity of uniformly spaced openings between segments of uniform size, and operatively supported in said device to effect disappearance of a light image by locating one of said segments in said cone by light associated therewith and the subsequent appearance of said light image by relocating said segment out of said cone of light and locating therein spaced openings of said shutter member.

3. The optical system of claim 1 wherein said viewing mechanism comprises an outer shell and said apportioned means comprises a casing in which said light passage elements are a multiplicity of identical apertures uniformly spaced apart by segments of said casing in said separated section thereof constituting an arrangement where said apertures of one of said sections are juxtaposed to said casing segments in said other of said sections, singular sight openings on opposite sides of said shell extended across said separated sections and in alignment therewith whereby sighting through said viewing mechanism is unobstructed when said apertures overlap said sight openings.

4. An optical system producing a stereoscopic image comprising a pair of light processing mechanisms, a viewing datum adapted to receive thereon light emanating from said mechanisms, a means supporting thereon diapositive conformations in cones of light including said emanated light whereby images from said conformations are created in said cones of light and caused to appear on said viewing datum, said mechanisms including dual means located in said cones of light and operative therein to alternately effect the disappearance of one of said images from said viewing datum and the subsequent appearance of the other image thereon, each said light processing mechanism being a controlled light projecting device, and each said dual means comprises a shutter member having a multiplicity of uniformly spaced openings between segments of uniform size, and operatively supported in said device to effect disappearance of a light image by locating one of said segments in said cone by light associated therewith and the subsequent appearance of said light image by relocating said segment out of said cone of light and locating therein spaced openings of said shutter member, said controlled light projecting device comprises an integral structure including three enclosure parts having a first partition element between said first and second enclosure parts and a second partition element between said second and third enclosure parts, said first and second partition elements having formed therein first and second apertures, respectively, defining an open passage between said enclosure parts, a condenser lens means mounted in said third enclosure part opposite to said second partition, a connector plate having a further aperture therein adjacent to and in overlapping relationship with said first aperture, a lamp and support means therefor, mounted on said plate in said first enclosure part, locating the lamp to place the filament thereof substantially in line with a central area of said first, second and further apertures, a clamp bracket fixed to said plate having suspended therefrom in said second enclosure part a motor clamped therein, a shaft extending from said motor having affixed thereto said shutter member whereby said segments and open spaces of said shutter member are disposed to pass across said overlapping apertures in response to motor operation driving said shutter member, a viewing mechanism comprising means apportioned in two separated sections having arranged therein light passage elements through which is discernible by respective ones of the eyes of an observer said light image appearing on said viewing datum, said apportioned means being operatively supported in said viewing mechanism whereby light passage elements of each said section thereof functions to alternately effect viewings and blockings of said sighting of said appearing image by the respective eyes of the observer, and means commonly controlling said dual means and said apportioned means to operate in a synchronous, positive positioning manner with respect to each other.

5. The optical system of claim 4 wherein said lamp support is adjustably mounted on said connector plate to facilitate focusing said filament in a projection lens means supported on said diapositive support means, and said plate is adjustably biased with respect to said first enclosure part, and in contact with manipulatable means mounted on said first partition operative to locate said plate against said bias thereof whereby said lamp filament thereon is positionable with respect to said projection lens means.

6. An optical system producing a stereoscopic image comprising a pair of light processing mechanisms, a viewing datum adapted to receive thereon light emanating from said mechanisms, a means supporting thereon diapositive conformations in cones of light including said emanated light whereby images from said conformations are created in said cones of light and caused to appear on said viewing datum, said mechanisms including dual means located in said cones of light and operative therein to alternately effect the disappearance of one of said images from said viewing datum and the subsequent appearance of the other image thereon, a viewing mechanism comprising means apportioned in two separate sections having arranged therein light passage elements through which is discernible by respective ones of the eyes of an observer said light image appearing on said viewing datum, said apportioned means being operatively supported in said viewing mechanism whereby light passage elements of each said section thereof functions to alternately effect viewings and blockings of said sightings of said appearing image by the respective eyes of the observer, means commonly controlling said dual means and said apportioned means to operate in a synchronous, positive positioning manner with respect to each other, each of said duel means comprises an integral enclosure structure having means therein supporting a lamp means, a condenser lens means, and a shutter device between said lamp and lens means, said shutter device comprising a ring of uniformly spaced-apart opaque elements wherein the size of said elements and the spaces therebetween are substantially equal, and said means commonly controlling including motor means driving said shutter device with respect to said enclosure structure, whereby said opaque elements and spaces are moved across a cone of light derived from said lamp and directed through said lens means, said viewing mechanism comprising a shell including a casing having a closure element secured to each of its opposite ends, said apportioned means comprising a cylindrical part wherein said light passage elements of each of said sections are uniformly spaced apart apertures peripherally arranged about said part so as to juxtapose each aperture of one section with respect to the substance of said part spacing said apertures in the other of said sections, sight openings in said shell situated to allow a view of said appearing light images through said viewing mechanism when apertures are aligned with said sight openings, said closure element at one end of said casing containing a motor means of said means commonly controlling which comprises a driver shaft, means attaching said cylinder part to said shaft whereby said motor drives said cylinder part with respect to said shell.

7. The optical system of claim 6 wherein said several motor means driving said shutter members and said cylinder part are stepper motors each having a magnetic rotor part and stators which are individually energized with a directional potential, means alternately switching the direction of said potential of the respective ones of said stators whereby said rotor is impulsed in discrete steps to rotate in a predetermined direction, and circuit means connecting said stators of said several motors to said switching means whereby each of the said several motors are synchronously driven and magnetically detented by corresponding discrete impulsed steps.

8. An optical system producing a stereoscopic image comprising a pair of light processing mechanisms, a viewing datum adapted to receive thereon light emanating from said mechanisms, a means supporting thereon diapositive conformations in cones of light including said emanated light whereby images from said conformations are created in said cones of light and caused to appear on said viewing datum, said mechanisms including dual means located in said cones of light and operative therein to alternately effect the disappearance of one of the said images from said viewing datum and the subsequent appearance of the other image thereon, said diapositive support means comprises a pair of carriage means and each of said pair of light processing mechanisms comprises a means dependent from a respective one of said pair of carriage means whereby said dependent means supports one of said dual means within a corresponding one of said cones of light whereat said dual means alternately effects said disappearance and subsequent appearance of said light images on said viewing surfaces, a viewing mechanism comprising means apportioned in two separated sections having arranged therein light passage elements through which is discernible by respective ones of the eyes of an observer said light image appearing on said viewing datum, said apportioned means being supported in said viewing mechanism whereby light passage elements of each said section thereof functions to alternately effect viewings and blockings of said sighting of said appearing image by the respective eyes of the observer, and means commonly controlling said dual means and said apportioned means to operate in a synchronous, positive positioning manner with respect to each other.

9. The optical system of claim 8 wherein said dependent means comprises a housing including an open shell and a casing having a collar part constituting one end thereof and the other end thereof fastened to said carriage means, said shell having openings at opposite sides thereof which are formed and situated to receive therethrough passage of said corresponding cone of light, and means fastening said casing thereto at said collar part, said casing containing a stepper motor of said means commonly controlling which is secured in said collar part and arranged to situate an external stub of a shaft thereof centrally in said shell, said supported dual means being disposed within said shell by attachment to said shaft stub and comprising a shutter member having a multiplicity of uniformly spaced openings between segments of corresponding uniformity, said shutter member being operatively supported in said shell to effect disappearance of a light image by locating one of said segments in said corresponding cone of light and the subsequent appearance of said light image by relocating said segment out of said cone of light and locating therein spaced openings of said shutter member.

10. The optical system of claim 8 wherein each of said dependent means comprises an arm pivotally supported at one end to a respective one of said carriage means, an extended portion of each of said arms constituting a collar, a stepper motor of said means commonly controlling which is fixed in each of said collars and providing a stub shaft to which is secured one of said dual means, each of said dual means comprising an elongated tubular element having slots and segments of substantially equal areas interspaced theraround and extending substantially the full length of said tubular element, and separate extensible means which are flexible in one coordinate direction respectively connecting each said arm at a point thereon along a line emanating from the pivotal axis of said arm to a respective opposite end of a frame fixed to said viewing datum, said extensible means being effective to maintain said slots and segments of said tubular member within said cones of light by pivoting said arms about the supports thereof as said viewing datum is moved with respect to said carriage means.

11. A viewing mechanism for an optical system producing a stereoscopic image, comprising a lens support frame wearable by an observer of said image, integral bracket elements adjustably secured at spaced apart opposite edges of said frame and projecting forwardly thereof, a rotatable means suspended from a projected portion of each of said bracket elements, an endless strip of flexible material mounted on said rotatable means and operable thereon to traverse across a sighting plane defined by the form of said frame, said strip having light passing and blocking areas of uniform size aligned in an alternating arrangement extending across said strip as a continuous procession of such areas, a uniformly operable drive means attached to one of said bracket elements, a driver member fixed to said rotatable means suspended from said drive attaching bracket element, means coupling said drive means to said driver member, said strip having portions thereof formed to enter into driving engagement with said driver member whereby operation of said drive means displaces said strip to move across said sighting plane and intermittently present light passing and blocking areas thereof alternately with respect to each eye of an observer of said image so as to simultaneously facilitate and obstruct sighting of said image by the respective eyes of the observer.

References Cited

UNITED STATES PATENTS

| | | | |
|---|---|---|---|
| 1,753,622 | 4/1930 | Owens | 352—59 |
| 2,273,512 | 2/1942 | Caldwell | 352—63 X |
| 2,492,870 | 12/1949 | Kelsh. | |
| 2,552,975 | 5/1951 | Kelsh. | |
| 2,696,752 | 12/1954 | Bean | 88—24 |
| 2,727,432 | 12/1955 | Kelsh. | |
| 2,747,461 | 5/1956 | Boughton. | |
| 2,833,178 | 5/1958 | Kelsh. | |
| 3,228,285 | 1/1966 | Kelsh. | |

FOREIGN PATENTS

| | | |
|---|---|---|
| 147,586 | 6/1936 | Austria. |
| 12,797 | 1912 | Great Britain. |

NORTON ANSHER, Primary Examiner

MONROE H. HAYES, Assistant Examiner

U.S. Cl. X.R.

352—63; 33—20; 350—136